US011127410B2

(12) United States Patent
Chiu et al.

(10) Patent No.: US 11,127,410 B2
(45) Date of Patent: Sep. 21, 2021

(54) VOICE DECODING DEVICE AND METHOD THEREOF

(71) Applicant: Wen-Ta Chiu, Taipei (TW)

(72) Inventors: Wen-Ta Chiu, Taipei (TW); Shuo-Chen Chien, Taipei (TW)

(73) Assignee: Wen-Ta Chiu, Taipei (TW)

( * ) Notice: Subject to any disclaimer, the term of this patent is extended or adjusted under 35 U.S.C. 154(b) by 58 days.

(21) Appl. No.: 16/680,901

(22) Filed: Nov. 12, 2019

(65) Prior Publication Data

US 2021/0142814 A1    May 13, 2021

(51) Int. Cl.
*G10L 19/18* (2013.01)
*G06K 9/00* (2006.01)
(Continued)

(52) U.S. Cl.
CPC .......... *G10L 19/18* (2013.01); *G06K 9/00255* (2013.01); *G06K 9/00281* (2013.01); *G10L 19/00* (2013.01); *G10L 2025/783* (2013.01)

(58) Field of Classification Search
CPC ... G10L 19/18; G10L 19/00; G10L 2025/783; G06K 9/00255; G06K 9/0028
See application file for complete search history.

(56) References Cited

U.S. PATENT DOCUMENTS

2007/0289012 A1* 12/2007 Baird ...................... H04L 9/321
726/17
2008/0229400 A1* 9/2008 Burke ................. G06F 21/6218
726/7

(Continued)

FOREIGN PATENT DOCUMENTS

CN    132032773 A    6/2011
CN    104766002 A    7/2015
(Continued)

OTHER PUBLICATIONS

NPL-CN_105117638_B_I-Yang-translation (Year: 2018).*
NPL-WO_2016106774_A1_I-Han-translation (Year: 2016).*
NPL-CN_107305605_A_I-Dong-translation (Year: 2017).*

*Primary Examiner* — Neeraj Sharma
(74) *Attorney, Agent, or Firm* — Birch, Stewart, Kolasch & Birch, LLP

(57) ABSTRACT

A method executed by a voice decoding device includes the following steps: receiving and determining whether an identification data is correct; if the identification data is incorrect, showing a decoding array, including plural characters, wherein positions of the plural characters are randomly distributed; receiving a numerical voice command, wherein the numerical voice command includes plural arranged decoding characters in regular turn; determining whether the numerical voice command corresponds to a preset decoding trace; arranging the plural decoding characters corresponding to the decoding array to form an arranged trace; when the arranged trace is the same as the decoding trace, unlocking the voice decoding device. By randomly displaying the decoding array, the invention permits a user to speak the sequence corresponding to the preset decoding trace so that unauthorized users cannot decode the voice decoding device by eavesdropping the pin, so as to achieve the better anti-theft effect.

8 Claims, 7 Drawing Sheets

(51) Int. Cl.
    *G10L 19/00*     (2013.01)
    *G10L 25/78*     (2013.01)

(56) References Cited

U.S. PATENT DOCUMENTS

| | | | |
|---|---|---|---|
| 2015/0154414 A1* | 6/2015 | Pike | G07F 7/1091 |
| | | | 726/30 |
| 2017/0004294 A1* | 1/2017 | Agrawal | H04W 12/06 |
| 2018/0122219 A1* | 5/2018 | Caterino | G07C 9/00174 |
| 2019/0354220 A1* | 11/2019 | Ribbich | G06F 1/1601 |
| 2020/0344076 A1* | 10/2020 | Brittan | H04L 9/3271 |

FOREIGN PATENT DOCUMENTS

| | | | | |
|---|---|---|---|---|
| CN | 106355058 A | | 1/2017 | |
| CN | 107305605 A | * | 10/2017 | G06Q 20/40 |
| CN | 105117638 B | * | 6/2018 | G06F 21/36 |
| TW | 201907330 A | | 2/2019 | |
| WO | WO-2016106774 A1 | * | 7/2016 | G06F 3/0488 |

\* cited by examiner

VOICE DECODING DEVICE AND METHOD THEREOF

BACKGROUND OF THE INVENTION

1. Field of the Invention

The invention relates to a decoding device and a method thereof, and particularly to a voice decoding device and a method thereof via inputting voices and sequences corresponding to a preset trace to prevent the pin from being seen and stolen.

2. Description of the Related Art

There are many types of burglarproof locks. For examples, the analogous burglarproof locks, such as the key lock, the turntable lock based on the safe, and the padlock based on rotating, and the safety lock based on biometric identification such as fingerprint recognition, voiceprint recognition, face recognition, and iris recognition, or the password lock with the digital display, all of which have an anti-theft function to some degree. The general door lock of a house usually utilizes the key lock as the anti-theft lock so that the residents can use the key to open the door and enter the house. Furthermore, the door lock often utilizes the lock based on the biometric identification as the anti-theft lock such as the electrical lock based on face recognition, and the residents can preset the standard file of face recognition for the authorized user to have access into and from the door. Therefore, only the authorized user can have access into and from the door via face recognition. In addition, the digital cipher lock, used simply and conveniently, is often applied to the door lock, so that when the residents input the correct pin, they can come in and out of the door.

However, the key lock, the electrical lock based on face recognition, or the digital cipher lock are all susceptible to decoding. For the electrical lock based on face recognition, the 3D printer method already can bypass face recognition. The digital cipher lock may be decoded when the resident inputs the pin, which might be skimmed or seen by an unauthorized person around the resident. Therefore, the security is a problem.

SUMMARY OF THE INVENTION

To improve the anti-theft effect for preventing the pin from being stolen easily by unauthorized individuals, the invention provides a voice decoding device and a method thereof by randomly displaying the decoding array to permit a user speaking the sequence corresponding to the preset decoding trace to achieve the better anti-theft effect.

To achieve the above purpose, the voice decoding method of the invention includes steps as follows:

receiving an identification data, and determining whether the identification data is correct;

if the identification data is incorrect, displaying a decoding array, including a plurality of characters, wherein positions of the plurality of characters are randomly distributed;

receiving a numerical voice command, wherein the numerical voice command includes a plurality of arranged decoding characters in regular turn;

determining whether the numerical voice command corresponds to a preset decoding trace, wherein the plurality of decoding characters are arranged according to the decoding array to form an arranged trace;

wherein when the arranged trace is the same as the decoding trace, determining that the numerical voice command corresponds to the decoding trace.

The invention further provides a voice decoding device for performing the above voice decoding method, including:

a CPU, for randomly generating a decoding array and receiving an identification data and a numerical voice command, the numerical voice command including a plurality of decoding characters arranged in regular turn and the decoding array including a plurality of characters, wherein the positions of the plurality of characters of the decoding array are randomly distributed;

a voice receiving unit, electrically connected to the CPU, for receiving the numerical voice command;

a display unit, electrically connected to the CPU, for showing the decoding array;

a storage unit, electrically connected to the CPU, for storing a decoding trace and a standard identity data;

wherein the plurality of decoding characters are arranged according to the decoding array to form an arranged trace; when the arranged trace is the same as the decoding trace, determining that the numerical voice command corresponds to the decoding trace.

The invention presets the decoding trace to permit the user to speak the randomly displayed decoding array in regular turn corresponding to the sequence of the decoding trace to finish decoding. Since the numbers of the decoding array are randomly arranged, the numerical voice command spoken by the user each time is not the same, and then people with malicious intentions cannot input the same pin according to the numerical voice command skimmed or eavesdropped by them, therefore failing to decode. Therefore, the decoding method of the invention is safer. Furthermore, the numerical voice command of the invention can be the second barrier coverage for identity recognition. When the user catches a cold or the vocal cords of the user are injured such that the voice of the user is slightly different from the voice of the user when speaking with the normal vocal cords, the CPU cannot verify the identity of the user for one hundred percent sure. The voice decoding device further displays the decoding array to permit the user to conform to the identification to avoid failure to recognize the identity that leads to failure to unlock the door.

DETAILED DESCRIPTION OF THE INVENTION

The invention is a voice decoding method, which commands that a user speaks a sequence conformed to a specific arrangement to the voice decoding device to perform decoding. The voice decoding device can be disposed outside a door of a house for an entrance guard. When the voice decoding device is decoded successfully, the door of the house is opened to permit the user to enter so as to avoid an unauthorized person entering the house.

Figure 1:
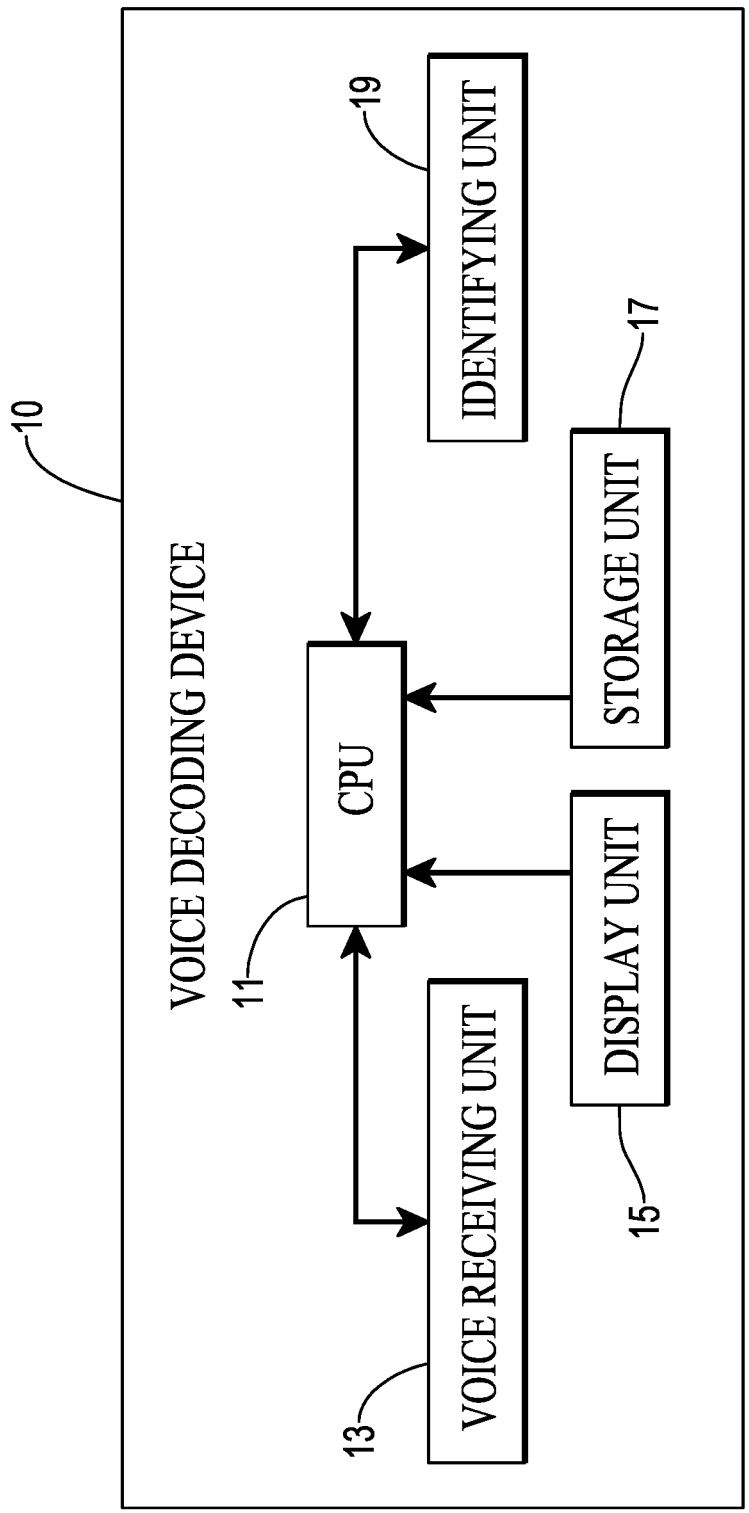
FIG. 1 is a block diagram of the voice decoding device of the present invention.
Figure 2:
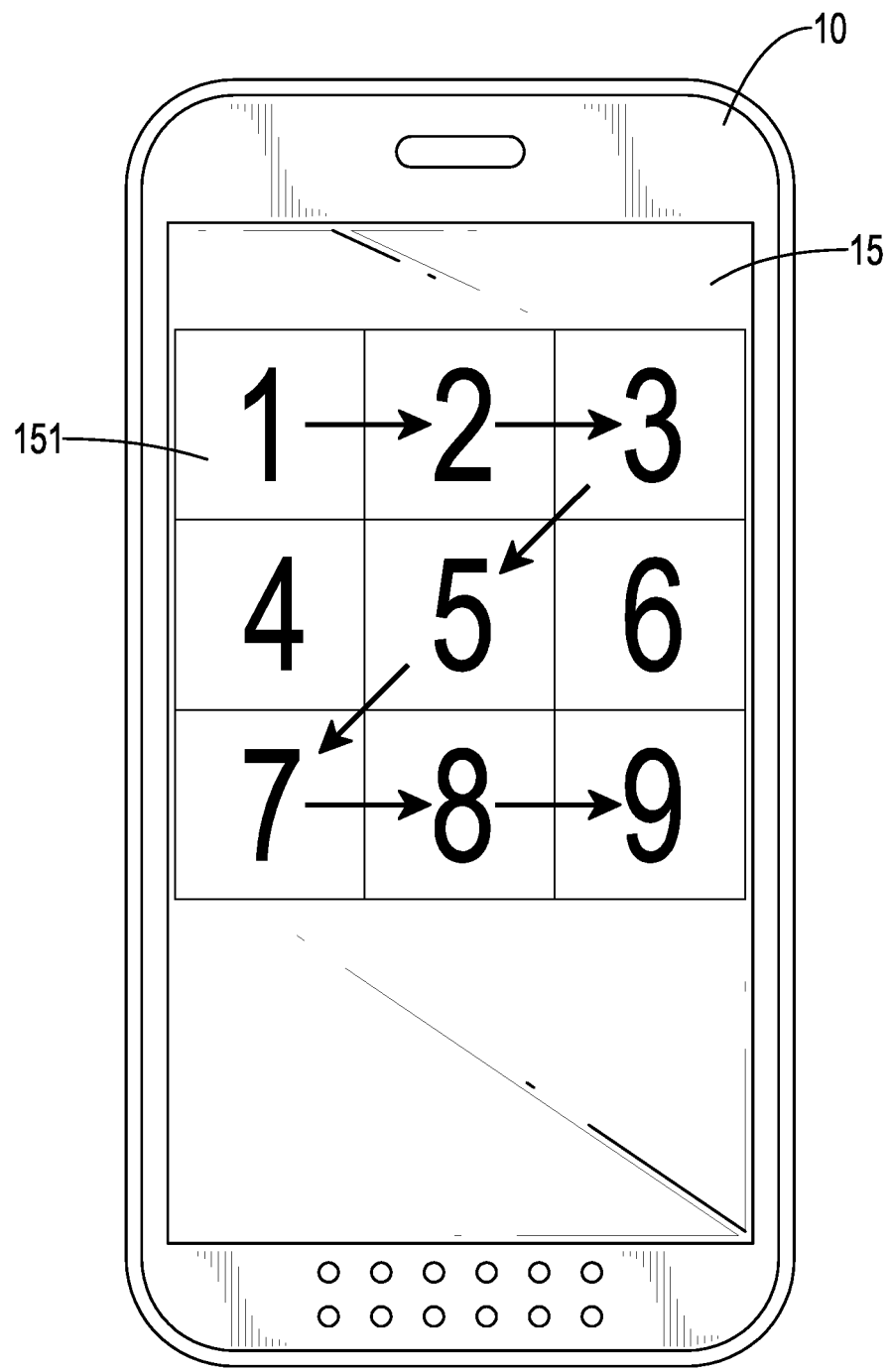
FIG. 2 is a first diagram of the voice decoding device displaying a 3×3 array of the present invention.

Please refer to FIG. 1 and FIG. 2; in the first preferable embodiment, the voice decoding device 10 includes a CPU 11, a voice receiving unit 13, a display unit 15 and a storage unit 17. The CPU 11 is used to randomly generate a decoding array 151 and receive an identification data. The decoding array 151 includes plural characters, the positions of which are randomly distributed. The decoding array 151 can be a 3×3 array, a 4×4 array, a 5×5 array and other square divisions, etc. or a 3×4 array, a 4×5 array and other rectangular divisions, etc. or a hive-like division. The following specification takes the 3×3 array for an embodiment but the embodiments in the invention are not limited thereto.

The voice receiving unit 13 is electrically connected to the CPU 11 for receiving the identification data and transmitting the identification data to the CPU 11 and for receiving a numerical voice command. The identification data can be a voiceprint data of a user, the numerical voice command includes plural decoding characters arranged in regular turn, the plural decoding characters form an arranged trace in regular turn in the decoding array 151, and the arranged trace is the trace formed by the plural decoding characters corresponding to the decoding array 151 in series in regular turn. For example, if the plural decoding numbers are 1, 4, 7, 8, 9, 6 and 3, the trace of the "U" shape can be obtained by connecting to the above decoding characters in series in the decoding array 151.

The display unit 15 is electrically connected to the CPU 11 for displaying the decoding array 151. The display unit 15 also can provide a touch function for the user to manipulate the voice decoding device 10 via touching the display unit 15.

The storage unit 17 is electrically connected to the CPU 11 for storing a preset decoding trace and a standard identity data wherein the decoding trace and the standard identity data can be set by the user and the decoding trace corresponds to the numerical voice command. For example, the decoding trace can be a symbol of a Z character, a "U" character or other more complex symbols. The standard identity data can be the standard voiceprint of the user. The voice receiving unit 13 receives the numerical voice command, wherein when the arranged trace formed by the plural numbers in the decoding array 151 corresponds to the decoding trace, the voice decoding device 10 unlocks the door. Furthermore, a decoding trace corresponds to the standard identity data, that is, each user with the permission independently owns a respectively decoding trace.

In the second preferable embodiment of the voice decoding device, which further includes an identifying unit 19, electrically connected to the CPU 11 for recognizing a user's identity and generating the identification data. In a preferable embodiment, the identifying unit 19 can be a face recognizer, which can scan a face of the user and obtain a face data. In the preferable embodiment of the identifying unit 19, the standard identity data of the storage unit 17 can be the face of the user.

By the above elements, the steps of the invention are introduced as follows. The steps of the invention can be divided to two stages: the first stage recognizes the user's identity and the second stage determines whether the arranged trace formed by the plural characters inputted by the user via the voice receiving unit 13 is correct. The first stage is introduced firstly.

Figure 3:
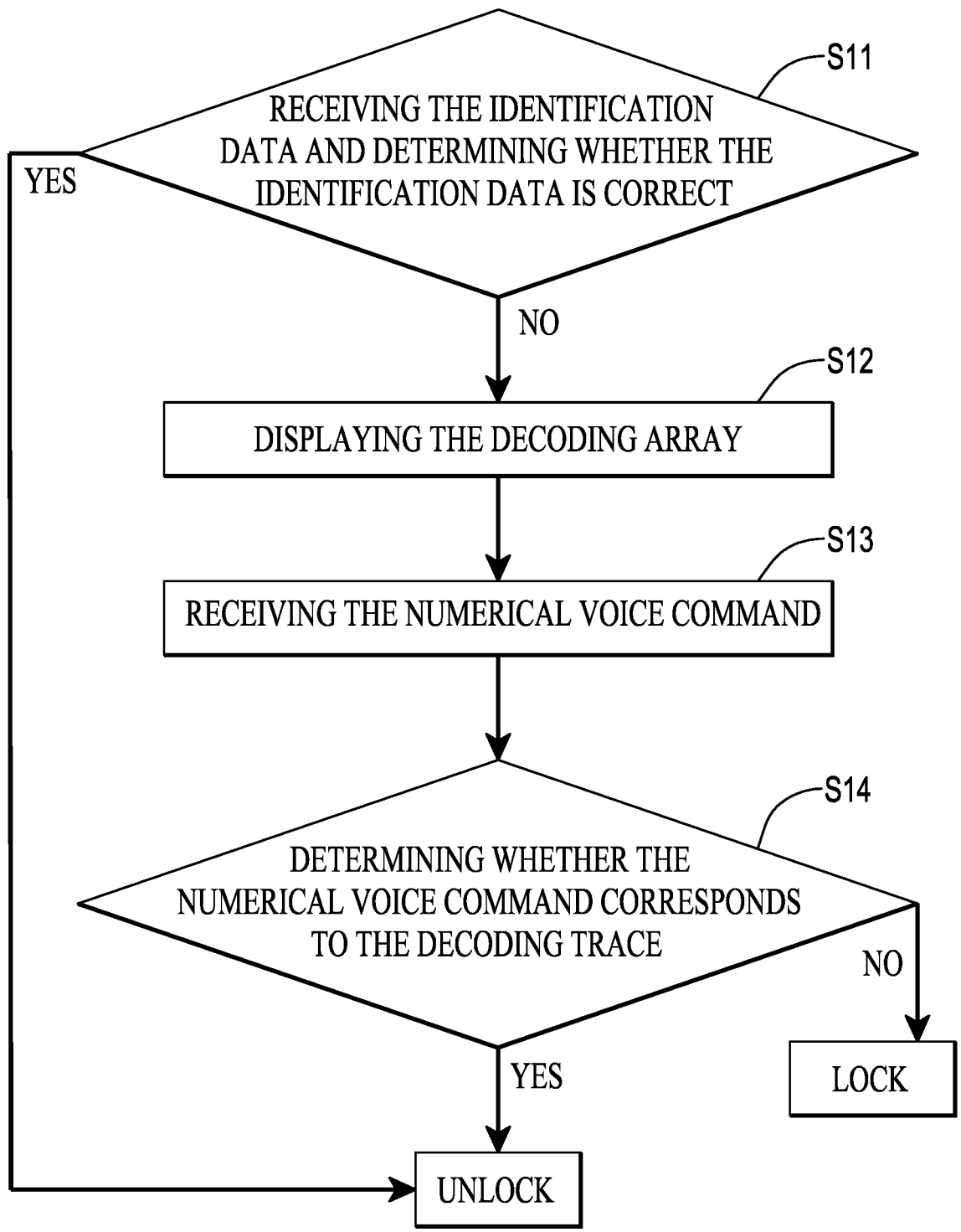
FIG. 3 is a flowchart of the present invention.
Figure 4:
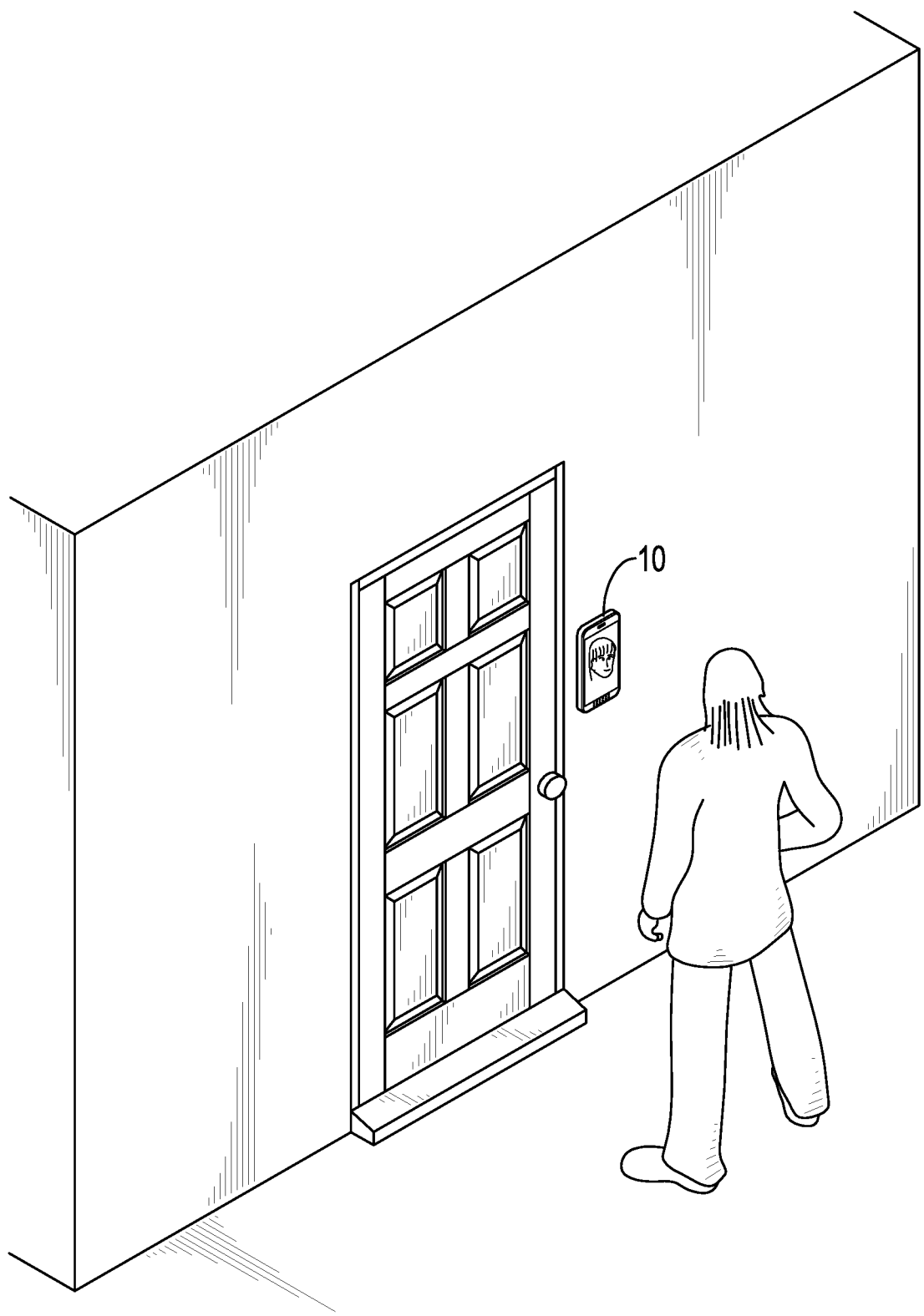
FIG. 4 is a diagram of face recognition of the present invention.

Please refer to FIG. 3, S11: receiving the identification data, and determining whether the identification data is correct. The voiceprint data of the user is received via the voice receiving unit 13 as the identification data, or the face data of the user is received via the identifying unit 19. Taking FIG. 4 as an example, the step is receiving the face data of the user. When the identification data is not corresponding to the standard identity data, the method proceeds to the next step.

Figure 5:
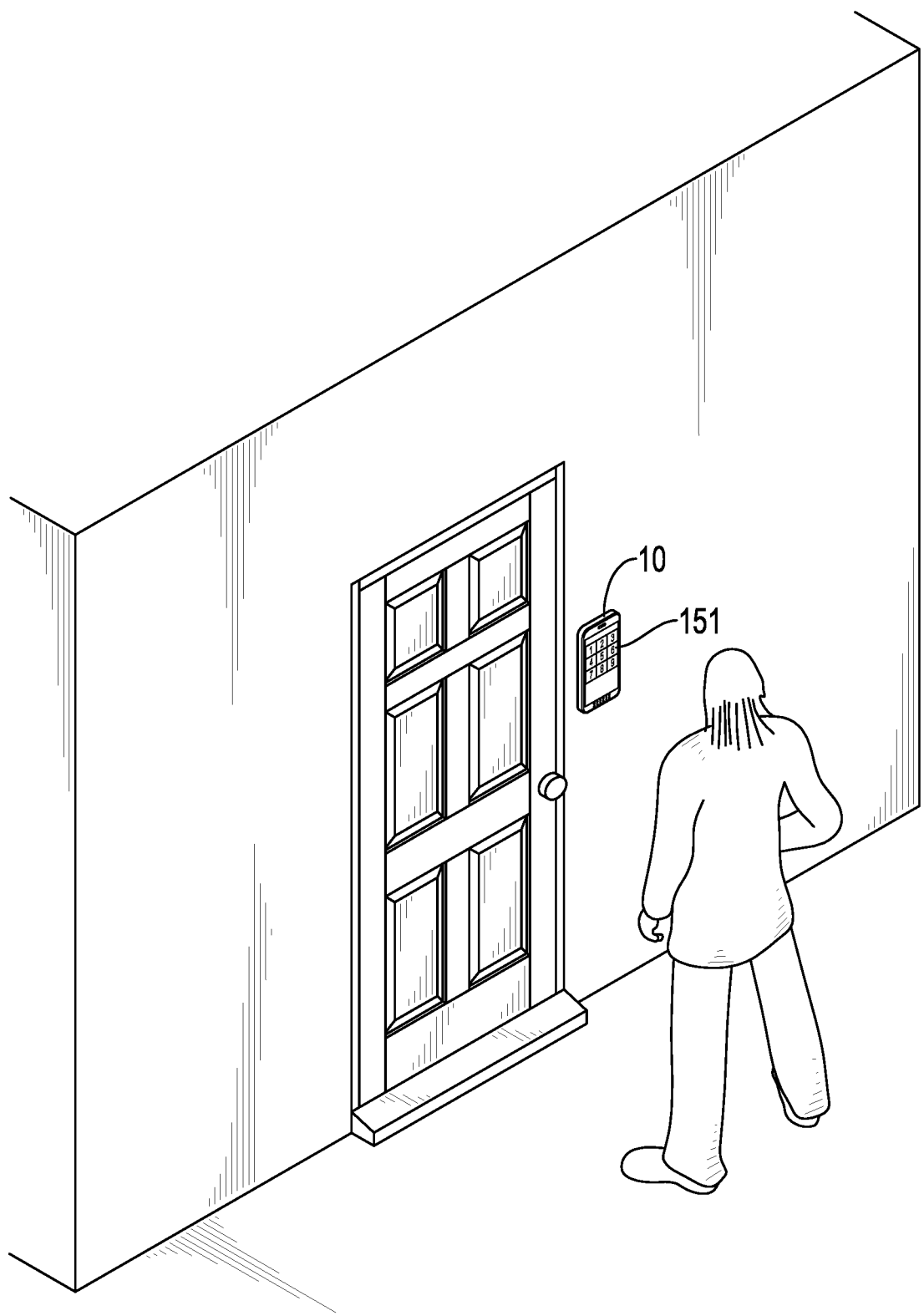
FIG. 5 is a diagram of inputting a decoding trace of the present invention.

The second stage:

Please refer to FIG. 5, S12: if the identification data is incorrect, the numbers of the decoding array 151 are displayed to the user. The decoding array includes the plural characters, and the positions of the plural characters are randomly distributed.

For example, please refer to FIG. 2, when the preset decoding trace is "Z", the user observes which combination of numbers in the decoding array 151 corresponds to the decoding trace, "Z". Taking FIG. 2 as an example, the numbers 1, 2, 3, 5, 7, 8 and 9 are corresponding to the plural characters of the decoding trace, "Z", and then the user speaks the numerical voice command by reading out the numbers 1, 2, 3, 5, 7, 8 and 9 in sequence for being received by the voice receiving unit 13.

S13: receiving the numerical voice command. The voice receiving unit 13 receives the numerical voice command spoken by the user according to the numbers of the decoding array 151.

S14: determining whether the numerical voice command corresponds to the decoding trace. If yes, the voice decoding device 10 unlocks the door; if not, the voice decoding device 10 keeps the door locked. Taking FIG. 2 for an example, when the decoding trace is "Z", the user speaks the sequence of numbers 1, 2, 3, 5, 7, 8 and 9 in regular turn and the trace of the arrangement is same as the decoding trace, "Z", the voice decoding device 10 determines the sequence matches the decoding trace. If somebody speaks a numerical sequence that is not the above sequence, the voice decoding device 10 determines the sequence does not match the decoding trace.

Figure 6:
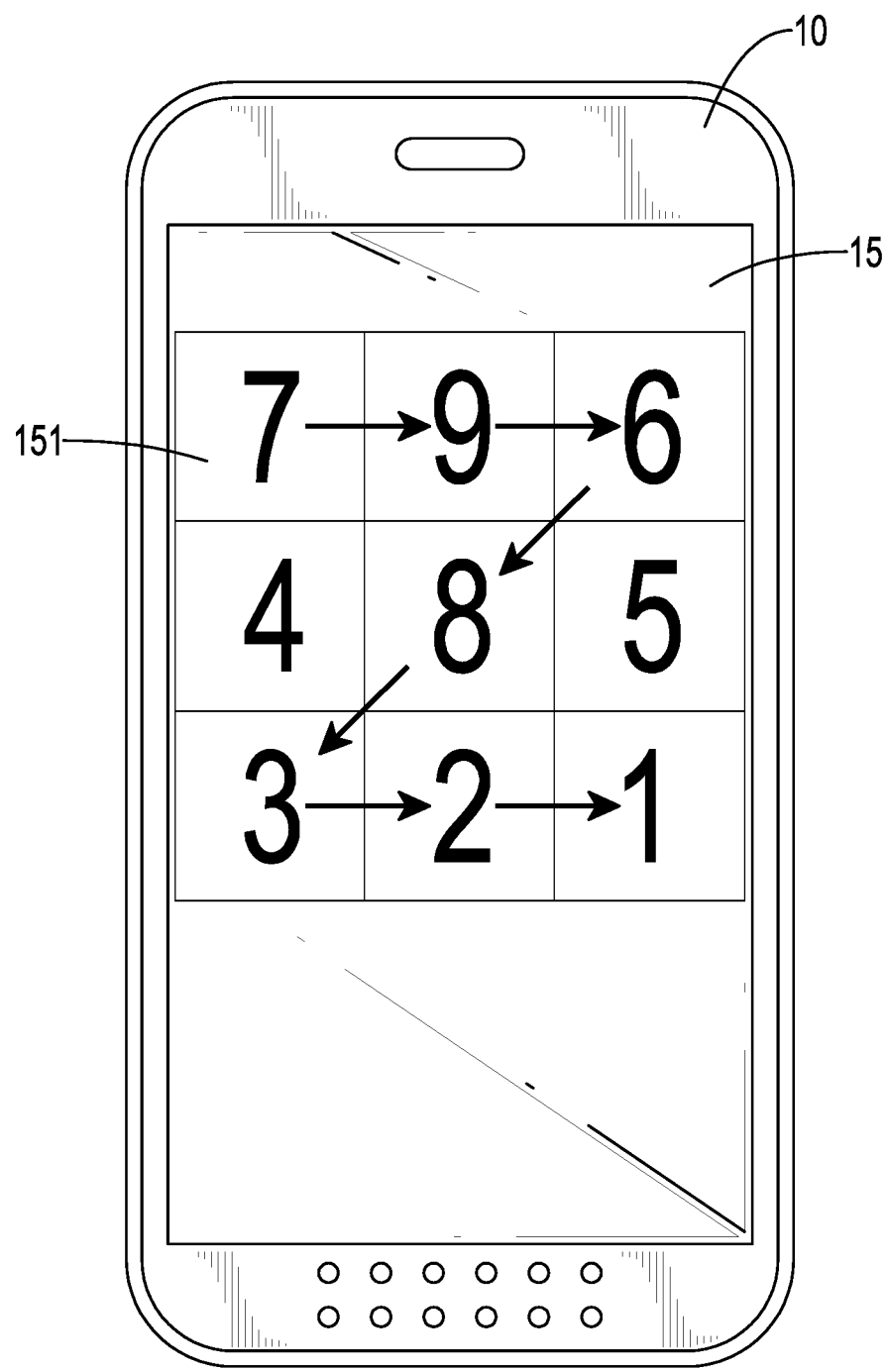
FIG. 6 is a second diagram of the voice decoding device displaying a 3×3 array of the present invention.
Figure 7:
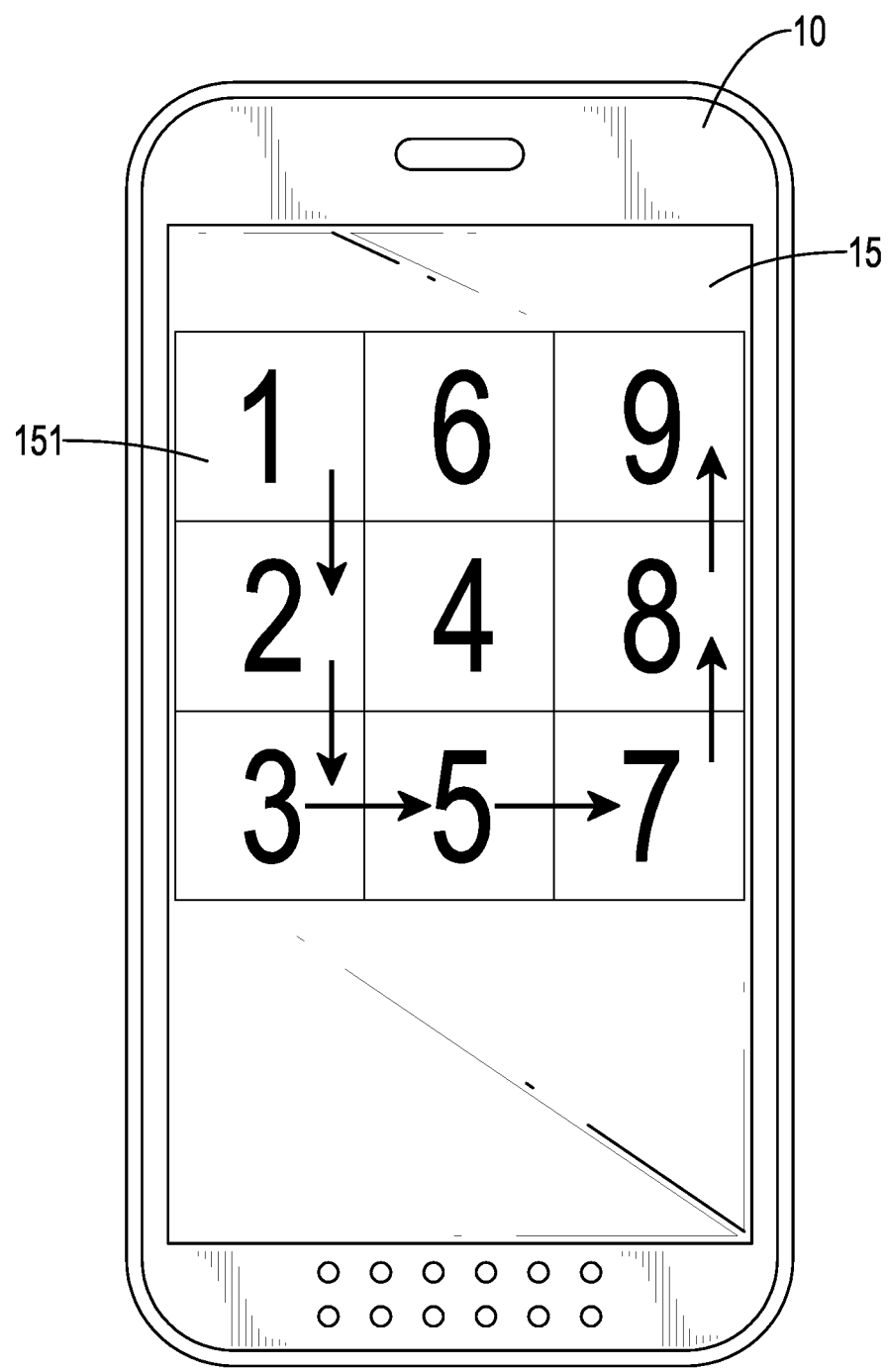
FIG. 7 is a third diagram of the voice decoding device displaying a 3×3 array of the present invention.

Furthermore, the CPU 11 will randomly generate the decoding array 151 so as to unlock each time, and the arrangement of the numbers in the decoding array 151 differs from time to time. For example, the decoding array 151 is showed as in FIG. 2 at one unlocking procedure and the decoding array 151 will be randomly showed as in FIG. 6 at another unlocking procedure, the number arrangement of the decoding array 151 in FIG. 2 is not the same as the number arrangement of the decoding array 151 in FIG. 6. But no matter which decoding array 151 the user encounters, the user speaks the sequence corresponding to the decoding trace, "Z", as the numerical voice command, and then the voice decoding device 10 determines the sequence matches the decoding trace. As the decoding array 151 shown in FIG. 6, the user speaks the numerical voice command by reading out the numbers 7, 9, 6, 8, 3, 2 and 1 in regular turn since the trace is formed by the sequence 7, 9, 6, 8, 3, 2 and 1 corresponding to the decoding trace, "Z", that is, the voice decoding device 10 determines that the unlocking procedure is successful. Please refer to FIG. 7, if a third party secretly records the sequence 1, 2, 3, 5, 7, 8 and 9 and speaks 1, 2, 3, 5, 7, 8 and 9 in turn at one unlocking procedure, since the number arrangement of the decoding array 151 has been changed, as shown in FIG. 7, the sequence 1, 2, 3, 5, 7, 8 and 9 will form the trace "U" according to the decoding array 151, which is not corresponding to the decoding trace, "Z", and then the door cannot be unlocked successfully, so as to achieve the anti-theft effect.

Hereby explaining, the invention can be applied when there is a doubt on recognizing the identification data to enable the identifying function of the numerical voice command. When the vocal cords or the face of the user is injured such that the CPU 11 cannot absolutely identify the identification data, the CPU 11 enables the decoding array 151 so that the user can try to be identified again via the numerical voice command, that is, the user can enter the door via the identifying method of the numerical voice command. Taking the voice identification as an example, one hundred pieces of voice identification data are generated when the user speaks; when the vocal cords of the user are normal and only ninety pieces of voice identification data are identified correctly, the door can be unlocked (identification rate: 90%); when the vocal cords of the user are injured such that the CPU 11 only can identify sixty pieces of voice identification data, the CPU 11 will enable the decoding array 151 to verify the identity of the user.

What is claimed is:

1. A voice decoding method, applied to a door of a house, including steps as follows:
   receiving an identification data, and determining whether the identification data is correct;
   if the identification data is correct, unlocking the door of the house;
   if the identification data is incorrect, showing a decoding array, including a plurality of characters, wherein positions of the plurality of characters are randomly distributed;
   receiving a numerical voice command, wherein the numerical voice command includes a plurality of arranged decoding characters in regular turn; and
   determining whether the numerical voice command corresponds to a preset decoding trace, wherein the plurality of decoding characters are arranged according to the decoding array to form an arranged trace and the door of the house is unlocked;
   wherein when the arranged trace is the same as the decoding trace, determining that the numerical voice command corresponds to the decoding trace, and
   wherein the decoding array is a 5×5 array.

2. The voice decoding method as claimed in claim 1, wherein the identification data is voiceprint data of a user.

3. The voice decoding method as claimed in claim 1, wherein the identification data is face data of a user.

4. The voice decoding method as claimed in claim 1, wherein the arranged trace is the trace formed by the plurality of decoding characters corresponding to the decoding array in series in regular turn.

5. A voice decoding device, disposed outside a door of a house, including:
   a central processing unit (CPU), for randomly generating a decoding array and receiving an identification data and a numerical voice command, the numerical voice command including a plurality of decoding characters arranged in regular turn and the decoding array including a plurality of characters, wherein positions of the plurality of characters of the decoding array are randomly distributed;
   a voice receiving unit, electrically connected to the CPU, for receiving the numerical voice command;
   a display unit, electrically connected to the CPU, for displaying the decoding array;
   a storage unit, electrically connected to the CPU, for storing a decoding trace and a standard identity data; and
   an identifying unit, electrically connected to the CPU for identifying user identification and generating the identification data,
   wherein if the identification data is correct, the door of the house is unlocked,
   wherein the plurality of decoding characters are arranged according to the decoding array to form an arranged trace; when the arranged trace is the same as the decoding trace, determining that the numerical voice command corresponds to the decoding trace and the door of the house is unlocked, and
   wherein the decoding array is a 5×5 array.

6. The voice decoding device as claimed in claim 5, wherein the voice receiving unit receives the identification data and transmits the identification data to the CPU.

7. The voice decoding device as claimed in claim 6, wherein the identification data is voiceprint data of a user.

8. The voice decoding device as claimed in claim 6, wherein the identification data is face data of a user.

* * * * *